(12) United States Patent
Langner

(10) Patent No.: US 10,232,562 B1
(45) Date of Patent: Mar. 19, 2019

(54) METHODS AND APPARATUS FOR MAKING A FABRIC THAT INCLUDES A THERMOPLASTIC

(71) Applicant: Richard F. Langner, Phoenix, AZ (US)

(72) Inventor: Richard F. Langner, Phoenix, AZ (US)

( * ) Notice: Subject to any disclaimer, the term of this patent is extended or adjusted under 35 U.S.C. 154(b) by 286 days.

(21) Appl. No.: 15/159,536

(22) Filed: May 19, 2016

Related U.S. Application Data

(60) Provisional application No. 62/164,753, filed on May 21, 2015.

(51) Int. Cl.
| | |
|---|---|
| *B29C 43/46* | (2006.01) |
| *B29C 65/18* | (2006.01) |
| *B29C 65/70* | (2006.01) |
| *D03D 15/00* | (2006.01) |
| *B29C 47/00* | (2006.01) |
| *B29C 43/24* | (2006.01) |
| *B29C 65/00* | (2006.01) |
| *B29K 101/12* | (2006.01) |
| *B29L 31/00* | (2006.01) |

(52) U.S. Cl.
CPC .............. *B29C 65/70* (2013.01); *B29C 43/24* (2013.01); *B29C 43/46* (2013.01); *B29C 47/003* (2013.01); *B29C 65/18* (2013.01); *B29C 66/69* (2013.01); *D03D 15/0027* (2013.01); *B29C 2043/464* (2013.01); *B29C 2043/465* (2013.01); *B29K 2101/12* (2013.01); *B29L 2031/707* (2013.01)

(58) Field of Classification Search
CPC ....... B29C 43/224; B29C 43/24; B29C 43/46; B29C 2043/461; B29C 2043/464; B29C 2043/465; B29C 2043/466; B29C 65/18; B29C 65/20; B29C 65/70; B29C 66/69; B29C 66/83413; B29C 70/20; B29C 70/22; B29K 2101/12; B29L 2031/707; D03D 15/00; D03D 15/0027
See application file for complete search history.

(56) References Cited

U.S. PATENT DOCUMENTS

| | | | |
|---|---|---|---|
| 2,749,261 A * | 6/1956 | Hardison | ................ B29C 65/20 156/47 |
| 2,773,297 A | 12/1956 | Cotchett | |
| 3,494,118 A | 2/1970 | Bobkowizc | |
| 3,548,581 A | 12/1970 | Bobkowizc | |
| 3,567,545 A | 3/1971 | Bobkowizc | |
| 3,737,357 A | 6/1973 | Bobkowizc | |
| 3,949,544 A | 4/1976 | Kitazawa | |
| 3,959,055 A | 5/1976 | Slanik | |
| 4,095,403 A | 6/1978 | Beraud | |
| 4,767,183 A * | 8/1988 | Martin | .................. B29C 43/224 174/120 C |
| 5,316,561 A | 5/1994 | Roncato | |
| 5,355,567 A | 10/1994 | Holliday | |
| 5,454,846 A | 10/1995 | Roncato | |
| 5,972,503 A | 10/1999 | Woodside | |
| 6,109,066 A | 8/2000 | Loubinoux | |

(Continued)

*Primary Examiner* — Michael A Tolin
(74) *Attorney, Agent, or Firm* — Letham Law Firm LLC; Lawrence Letham

(57) ABSTRACT

Methods and apparatus for bonding a strand of a yarn to a strand of a thermoplastic to form a bonded yarn. The bonded yarn may be used to weave a bonded fabric.

20 Claims, 3 Drawing Sheets

(56) References Cited

U.S. PATENT DOCUMENTS

| | | | |
|---|---|---|---|
| 7,135,226 B1 * | 11/2006 | Nagamoto | B29B 15/122 |
| | | | 428/365 |
| 7,465,418 B2 | 12/2008 | Boissonnat | |
| 8,470,114 B2 | 6/2013 | Jung | |
| 8,470,218 B2 | 6/2013 | Loubinoux | |

* cited by examiner

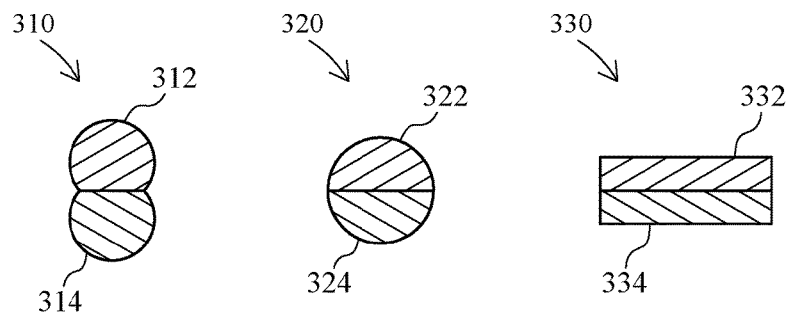
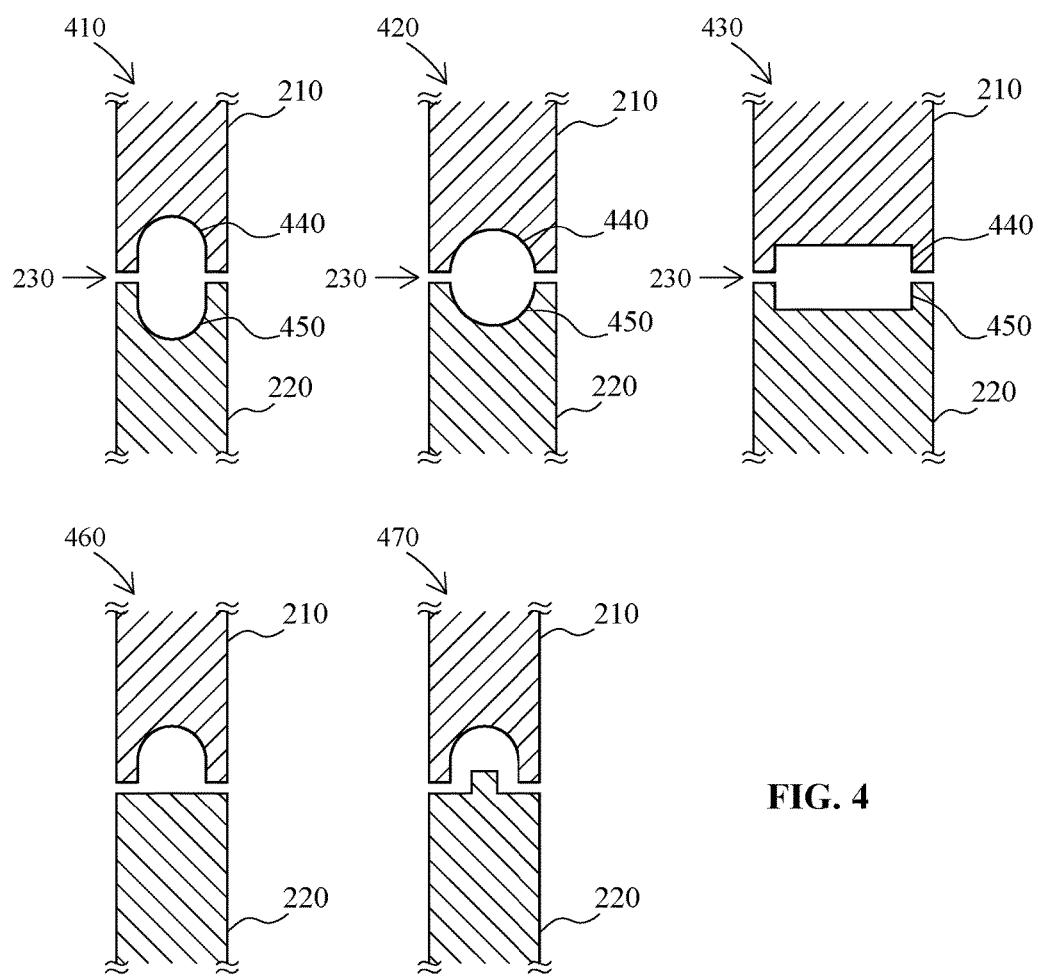
FIG. 3
FIG. 4

METHODS AND APPARATUS FOR MAKING A FABRIC THAT INCLUDES A THERMOPLASTIC

FIELD OF THE INVENTION

Embodiments of the present invention relate to making a fabric (e.g., cloth) that includes a thermoplastic and in particular in making a fabric that includes a thermoplastic that improves the ability of the cloth to drape over (e.g., conform to) the contours of an object.

BRIEF DESCRIPTION OF THE DRAWING

Embodiments of the present invention will be described with reference to the drawing, wherein like designations denote like elements, and:

FIG. 3 includes cross-sectional views of bonded yarns according to various aspects of the present invention;

FIG. 4 includes cross-sectional views of the shape of the rollers at the nip point of rollers of the bonder of FIG. 2;

Figure 1:
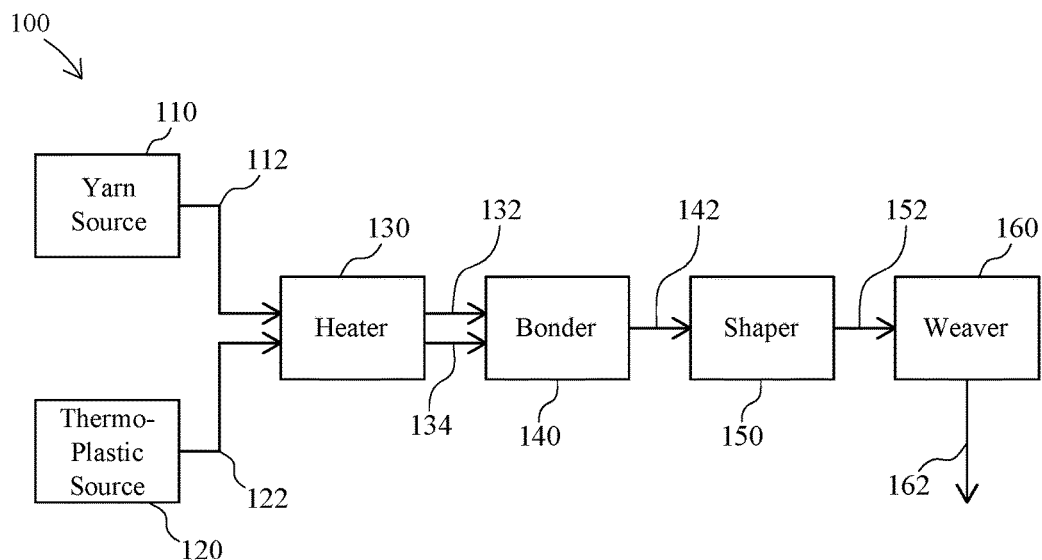
FIG. 1 is a functional diagram of a system for producing a cloth according to various aspects of the present invention.

The names of the elements identified by the numerical identifiers in the drawing are provided below. System 100 (for making bonded yarn and bonded cloth);
yarn source 110; yarn strand 112; thermoplastic source 120; thermoplastic strand 122; heater 130; heated yarn strand 132; heated thermoplastic strand 134; bonder 140; bonded yarn 142; shaper 150; shaped yarn 152; weaver 160; cloth 162; roller 210; roller 220; nip point 230; bonder 240; bonded strand profile 310; yarn strand 312; thermoplastic strand 314; bonded strand profile 320; yarn strand 322; thermoplastic strand 324; bonded strand profile 330; yarn strand 332; thermoplastic strand 334; bonding profile 410; bonding profile 420; bonding profile 430; cavity 440; cavity 450; bonding profile 460; bonding profile 470; top portion 510; bottom portion 520; surface 530; shaper 550; shaped yarn 600; yarn portion 610; thermoplastic portion 620; and altered portion 630.

DETAILED DESCRIPTION OF THE PREFERRED EMBODIMENTS

Yarn means a continuous strand of material that is ready without additional preparation (e.g., manufacturing steps, processing) to be used as the warp and weft in weaving, for knitting, or for other interlacings that form a cloth (e.g., fabric).

Strand means a single fiber (e.g., filament) or two or more fibers (e.g., filaments) twisted or coupled together to form a unit.

Fiber or filament means a natural or man-made object that has a length usually many hundred or thousand times greater than its width (e.g., thread).

Thermoplastic means a polymer (e.g., plastic) that becomes pliable or moldable above a specific temperature. Thermoplastics include polypropylene, polyethylene, polyurethane. A thermoplastic may be extruded to form a fiber. The term thermoplastic may also be referred to as thermoplastic resin.

Coated fabric means a fabric that has been combined with a thermoplastic such that the thermoplastic coats (e.g., covers, spread over) the fabric surface and bonds adjacent fibers.

Comingled yarn means a strand of yarn formed of two or more fibers in which at least one of the fibers is formed of a thermoplastic.

The fiber or fibers of a strand may be formed of any material. For a strand formed of a single fiber, the fiber may include a single continuous man-made fiber produced from a liquid bath as by extrusion through a small orifice. For a strand formed of two or more fibers, the fibers may be formed of the same or of different materials. The fiber or fibers of a strand may be formed of a synthetic and/or composite material, such as aramids (e.g., aromatic aramids, para-aramids, meta-aramids, Kevlar, Nomex, Technora), fiberglass, high molecular weight polyethylene, and carbon fiber.

A yarn whose single strand is formed of a composite fiber, or whose two or more fibers are formed of different materials, or whose two or more fibers include at least one fiber formed of a composite material is referred to herein as a composite yarn. A cloth woven from a composite yarn is referred to herein as a composite cloth or composite fabric.

The thermoplastic content (e.g., amount) of a comingled yarn may be determined by the number of the total fibers of the strand that are formed of thermoplastic, weight of thermoplastic fiber as compared to the weight of the other fibers, or the diameter of the thermoplastic relative to the total diameter of the strand of yarn. The amount of thermoplastic in a comingled yarn cannot be modified (e.g., altered, changed) after the yarn has been manufactured.

A coated fabric may be made manufactured using any conventional process such as a laminating process, a powder coating process, or a resin-dipping process. The fabric used to produce a coated fabric includes any conventional fabric including composite fabrics. A coated fabric is stiff because the thermoplastic bonds adjacent fibers of the fabric to each other. A coated fabric is less suitable for forming a component that has a complex shape because fitting the coated fabric to the complex shape may require cutting the coated fabric. Cuts in the coated fabric weaken the structure of the component formed of the coated fabric. The cuts needed for the coated fabric to conform to the complex shape may be made before the coated fabric is coated. A cut in the coated fabric used to form armor may create areas in the armor that are weak and are less able to provide protection.

A fabric woven from a comingled yarn, referred to herein as a comingled fabric, is more flexible than a coated fabric. A comingled fabric is better suited than a coated fabric for draping over the contours of a complex shape so that the comingled fabric better follows the contours of the complex shape. However, weaving a fabric using comingled yarn requires that the thermoplastic content of the comingle yarn be selected in advance of making the yarn, which may precede fabric manufacture by a considerable amount of time. Comingle yarns make it difficult or costly (e.g., extensive inventory, unused inventory, high cost of small batch) to produce fabrics with different thermoplastic content.

The ability to adjust the content of a thermoplastic in a yarn just prior to weaving the yarn into a cloth or adjusting the content of the thermoplastic in a yarn while the cloth is being woven provides a significant advantage to creating a fabric that includes thermoplastic.

The apparatus and method disclosed herein and in FIGS. 1-6, according to various aspects of the present invention, includes creating a bonded yarn that is suitable for weaving into a fabric using conventional weaving techniques.

A bonded yarn is a strand of yarn, whether conventional or composite, to which a strand of thermoplastic has been bonded (e.g., attached, coupled). The thermoplastic strand may be bonded to the yarn in such a manner so that the yarn is separate and/or distinguishable from the thermoplastic strand except where bonded. The thermoplastic portion of a bonded yarn may be shaped after bonding by a die (e.g., shaper) that alters the shape of the thermoplastic portion of the bonded yarn to form a shaped yarn.

A bonded yarn and a shaped yarn is dry, so that it may be used in any conventional weaving process and/or with any conventional weaving equipment to weave cloth. Cloth woven of bonded yarn is referred to herein as bonded fabric.

The process for creating a bonded yarn may occur in-line and just prior to the weaving process. In-line preparation of a bonded yarn just prior to weaving eliminates the need to carry a stock (e.g., inventory) of comingled yarns of different thermoplastic content.

Further, the content of the thermoplastic in a bonded yarn may be adjusted for in-line manufacture, by changing the thickness of the thermoplastic strand, changing the number of fibers of thermoplastic material in the thermoplastic strand, and or removing thermoplastic content via shaping after bonding. A change in the content of the thermoplastic in the bonded yarn may occur while weaving a bonded fabric so that the content of the thermoplastic varies throughout a bolt of bonded fabric. A change in the content of the thermoplastic in the bonded yarn may occur between weaving separate bolts of bonded fabric so the thermoplastic content of a single bolt is consistent (e.g., the same), but the thermoplastic content of each bolt is different.

The flexibility of a bonded fabric makes it suitable for following the contours of (e.g., draping over) a complex shape without cutting the fabric thereby avoiding creating weak portions in the fabric. In situations where bonded fabric is used to make armor, the bonded fabric may result in fewer weak points (e.g., spots, locations) in the armor than if comingled fabric or coated fabric were used. Further, because the content of thermoplastic in the bonded yarn can be changed linearly along the bonded yarn, a bonded fabric could be woven so that portions of the bonded fabric that will be placed to in critical portions of the armor could have more thermoplastic content than other portions of the bonded fabric.

A system for forming a bonded yarn and a bonded fabric are shown in FIG. 1. System 100 includes yarn source 110 that provides yarn strand 112, thermoplastic source 120 that provides thermoplastic strand 122, heater 130 that receives yarn strand 112 and thermoplastic strand 122 and provides heated yarn strand 132 and heated thermoplastic strand 134, bonder 140 that receives heated yarn strand 132 and heated thermoplastic strand 134 and provides bonded yarn 142, shaper 150 that receives bonded yarn 142 and provides shaped yarn 152, and weaver 160 that receives bonded yarn 152 and provides bonded fabric 162.

Additional information regarding implementations of components (e.g., apparatus, subsystems) of system 100 for forming a bonded yarn are shown in FIGS. 2-6.

Yarn source 110 provides yarn strand 112 for bonding and weaving. Yarn source 110 may provide a conventional yarn or a composite yarn. The yarn provided by yarn source 110, as per the definition of the term yarn, is ready for use in a weaving process. If the yarn provided by yarn source 110 were not to be bonded, yarn source 110 could provide yarn strand 112 directly to weaver 160. Yarn strand 112 is continuous. Yarn strand 112 is a single strand. Yarn strand 112 may be extracted from yarn source 110 using any force. In one implementation, yarn strand 112 is pulled from yarn source 110.

Thermoplastic source 120 provides thermoplastic strand 122 for bonding and weaving. Thermoplastic strand 122, as per the definition of the term strand, may be as single fiber or two or more fibers twisted or coupled together to form a unit. Thermoplastic source 120 may be an extrusion process that extrudes thermoplastic strand 122 from a bath of thermoplastic resin. Thermoplastic source 120 may be a coil or skein of thermoplastic strand. A coil or skein of thermoplastic strand may include conventional thermoplastic thread and/or monolithic filament (e.g., fishing line) available through conventional commercial sources. Thermoplastic strand 122 is continuous. Thermoplastic strand 122 may be extracted from thermoplastic source 120 using any force. In one implementation, thermoplastic strand 122 is pulled from thermoplastic source 120.

Heater 130 provides heat to prepare yarn strand 112 and/or thermoplastic strand 122 for bonding. The term "heat" or "providing heat" refers to both the adding energy (e.g., heat) to increase the temperature of strand 112 and/or thermoplastic strand 122 or subtracting energy (e.g., cooling) to decrease the temperature of strand 112 and/or thermoplastic strand 122. Accordingly, heater 130 may heat and/or cool yarn strand 112 and/or thermoplastic strand 122 to any temperature suitable to accomplish bonding between yarn strand 112 and thermoplastic strand 122 as discussed herein, so heated yarn strand 132 and heated thermoplastic strand have temperature that may be different from yarn strand 112 and thermoplastic strand 122 respectively whether warmer or cooler.

Heater 130 heats yarn strand 112 and/or thermoplastic strand 122 to a temperature suitable for bonding thermoplastic strand 122 to yarn strand 112 under pressure. Yarn strand 112 may be heated independently of thermoplastic strand 122. Yarn strand 112 may be heated to the same or a different temperature than thermoplastic strand 122. Heater 130 may impart no heat to yarn strand 112 and/or thermoplastic strand 122. Yarn strand 112 and thermoplastic strand 122 enter heater 130 and exit heater 130 as heated yarn strand 132 and heated thermoplastic strand 134.

Bonder 140 applies pressure to heated yarn strand 132 and heated thermoplastic strand 134 in such a manner so that a portion of heated yarn strand 132 bonds (e.g., adheres, couples, mates) to heated thermoplastic strand 134. Because heated yarn strand 132 and heated thermoplastic strand 134 are pulled through bonder 140, heated yarn strand 132 and heated thermoplastic strand 134 are bonded to each other along their lengths.

Heater 130 may be physically and/or process-wise proximate to bonder 140 so that the yarn strand 112 and/or thermoplastic strand 122 reach a temperature appropriate for bonding just prior to bonding. In one implementation, the function of heater 130 is accomplished by adjusting (e.g., heat, cool, maintain) the temperature of roller 210 and/or roller 220. In another implementation, the temperature of roller 210 and/or roller 220 may be adjusted in addition to the adjustment in temperature imparted by heater 130. In an implementation, the temperature adjustment to yarn strand 112 and/or thermoplastic strand 122 occurs at a location that is physically proximate to nip point 230. In an implementation, the temperature adjustment to yarn strand 112 and/or thermoplastic strand 122 occurs during bonding, which includes temperature adjustment at nip point 230.

Bonding includes mechanical bonding. Bonding may include chemical bonding. Bonding may be accomplished by aligning the length of heated yarn strand 132 to the length of heated thermoplastic strand 134 and applying pressure so that a portion of heated yarn strand 132 couples to a portion of heated thermoplastic strand 134 along the lengths thereof.

Bonding occurs between a single strand of yarn and a single strand of thermoplastic. Bonder 140 aligns heated yarn strand 132 in the form of a single strand to heated thermoplastic strand 134 in the form of a single strand. Bonder 140 applies pressure so that heated yarn strand 132 touches (e.g., contacts) heated thermoplastic strand 134. Bonder 140 applies pressure to heated yarn strand 132 and heated thermoplastic strand 134 so that heated yarn strand 132 bonds to heated thermoplastic strand 134. Bonder 140 applies a magnitude of pressure to facilitate bonding between heated yarn strand 132 and heated thermoplastic strand 134. Heated yarn strand 132 bonds to heated thermoplastic strand 134 along the lengths thereof to form bonded strand 142.

Bonded strand 142 exits bonder 140. Bonder 140 may be followed by a cooling unit (not shown) if needed to cool bonded strand 142. Bonded strand 142 may be wound on a spool for later use such as shaping and/or weaving.

Bonded strand 142 enters shaper 150. If shaping is not necessary, shaper 150 may be omitted. Shaper 150 alters the shape of the thermoplastic portion of bonded strand 142. Shaping may include altering the shape of the thermoplastic portion of bonded strand 142 and/or removing a portion of the thermoplastic portion of bonded strand 142. Altering the shape of the thermoplastic portion of bonded strand 142 may occur when the thermoplastic portion of bonded strand 142 is susceptible to being shaped (e.g., malleable). The thermoplastic portion of bonded strand 142 may be more susceptible to being shaped if it has not fully cooled from the heating process of heater 130 and/or the heat that may result from the pressure applied by bonder 140. Removing a portion of the thermoplastic portion of bonded strand 142 may be accomplished by a die (e.g., cutter). Once bonded strand 142 has been shaped, it exits shaper 150 as shaped strand 152.

Shaped strand 152 may be wound on a spool for later use such as weaving. Bonded strand 142 and/or shaped strand 152 may be stored on a spool for later use thereby reducing the number of in-line bonders required to support a weaving process that uses multiple sources of yarn at the same time.

Weaver 160 receives bonded strand 142 if shaper 150 is omitted or shaped strand 152. Whether bonded strand 142 or shaped strand 152, the strand that enters weaver 160 is a dry strand suitable for being woven into a cloth using conventional weaving techniques and conventional weaving equipment. Weaver 160 may receive other strands in addition to bonded strand 142/shaped strand 152. Weaver 160 performs a convention weaving process to weave bonded strand 142/shaped strand 152 into fabric. Fabric formed using bonded strand 142/shaped strand 152 is referred to herein as bonded fabric.

Figure 2:
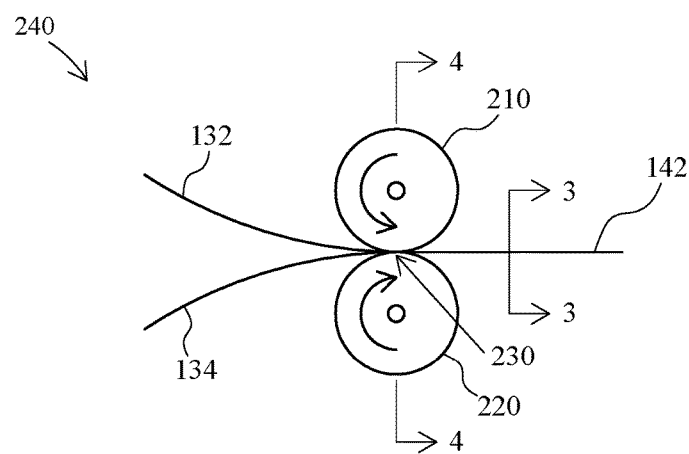
FIG. 2 is a plan view of an implementation of the bonder of FIG. 1.

An implementation of bonder 140 is shown in FIG. 2 as bonder 240. Bonder 240 includes roller 210 and roller 220. Roller 210 turns in a counterclockwise direction and roller 220 turns in a clockwise direction. Roller 210 is proximate to roller 220. The closest point between roller 210 and roller 220 is referred to as nip point 230.

In another implementation of bonder 140, two or more pairs of rollers are used to accomplish bonding.

Roller 210 may include cavity 440 formed around its periphery (e.g., circumference, perimeter) for receiving heated yarn strand 132 in the form of a single strand. Roller 220 may include a cavity 450 formed around its periphery for receiving heated thermoplastic strand 134 in the form of a single strand. Roller 210 and roller 220 are positioned relative to each other so that as they turn, and possibly pull heated yarn strand 132 and heated thermoplastic strand 134 into bonder 240, they align the length of heated yarn strand 132 with length of heated thermoplastic strand 134. It is at nip point 230 that heated yarn strand 132 is pressed against heated thermoplastic strand 134.

Because roller 210 and roller 220 cooperate to bond heated yarn strand 132 and heated thermoplastic strand 134 together, the shapes of the peripheries of roller 210 and roller 220 may cooperate to accomplish bonding. As discussed above, one roller or both rollers may include a cavity (e.g., groove) around their periphery to accept heated yarn strand 132 and/or heated thermoplastic strand 134 to bond them together. In another implementation, referring to bonding profile 460, only one roller includes a cavity along its periphery while the other roller if flat (e.g., no cavity) along its periphery. In another implementation, referring to bonding profile 470, one roller includes a cavity along its periphery while the other roller includes a protrusion along its periphery that enters the cavity of the other roller to applies pressure to heated yarn strand 132 and heated thermoplastic strand 134 to bond them together.

Roller 210 and roller 220 are separated from each other a distance so that roller 210 presses heated yarn strand 132 against heated thermoplastic strand 134 with sufficient pressure to accomplish bonding. The spacing between roller 210 and roller 220 may be decreased to increase the magnitude of the pressure applied to heated yarn strand 132 and heated thermoplastic strand 134. The spacing between roller 210 and roller 220 may be increased to decrease the magnitude of the pressure applied to heated yarn strand 132 and heated thermoplastic strand 134.

Roller 210 and roller 220 may be replaced with plates if pressure must be applied to heated yarn strand 132 and heated thermoplastic strand 134 for a longer time than the time the stands are positioned at nip point 230.

Any other conventional equipment may be used to apply pressure to heated yarn strand 132 and heated thermoplastic strand 134 to bond them together.

Roller 210 and roller 220 may hold (e.g., grip) with heated yarn strand 132 and heated thermoplastic strand 134 to pull yarn strand 112 and thermoplastic strand 122 from yarn source 110 and thermoplastic source 120 respectively. Holding may be accomplished by friction and/or suction. The inner surface of cavity 440 and/or cavity 450 may be shaped to provide bonded yarn 142 with a particular profile or to bond more or less of the surface of heated yarn strand 132 to heated thermoplastic strand 134.

Profiles (e.g., cross-sections) of bonded yarns are provided in FIG. 3. Profile 310 shows a profile where yarn strand 312 and thermoplastic strand 314 are substantially circular and separate from each other with a portion of each circle flatten to accomplish bonding. The shape of cavity 440 and 450 as shown in bonding profile 410 may produce profile 310. Profile 320 shows a profile where yarn strand 322 and thermoplastic strand 324 are pressed so that they become substantially semi-circular in shape thereby producing a substantially circular cross-section for the bonded yarn. The shape of cavity 440 and 450 as shown in bonding profile 420 may produce profile 320. Profile 330 shows a profile where yarn strand 332 and thermoplastic strand 334 are substantially flat to produce a substantially rectangular bonded yarn. The shape of cavity 440 and 450 as shown in bonding profile 430 may produce profile 330. Bonding profiles 460 and 470 are discussed above.

The shape of cavity 440 of roller 210 that applies pressure to heated yarn strand 132 and/or the shape of cavity 450 of roller 220 that applies pressure to heated thermoplastic strand 134 may be any suitable shape (e.g., triangular, square, rectangular, wavy) for shaping heated yarn strand 132 and heated thermoplastic strand 134 of bonded yarn 142.

Figure 5:
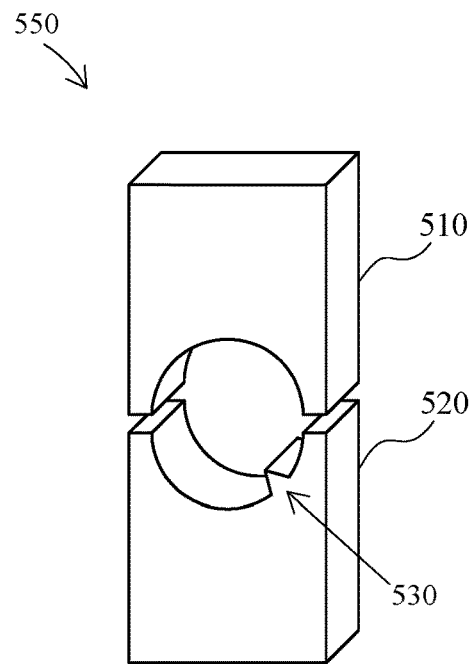
FIG. 5 is a cross-sectional view of an implementation of the shaper of FIG. 1.

An implementation of shaper 150 is shown in FIG. 5 as shaper 550. Shaper 550 is primarily for shaping the thermoplastic portion of shaped yarn 152. In this implementation, bonded yarn 142 enters shaper 550, is pulled through shaper 550, and exits shaper 550 as shaped yarn 152. As discussed above, a surface of shaper 550, in this implementation surface 530, presses against the thermoplastic portion of shaped yarn 152 while it is still malleable to alter the shape of the thermoplastic portion of shaped yarn 152. Surface 530 could also include a sharp edge for removing some of the material from the thermoplastic portion of bonded yarn 142 to form shaped yarn 152.

Top portion 510 of shaper 550 receives the yarn portion of bonded yarn 142. In this implementation, the shape of the yarn portion of bonded yarn 142 is not altered. Top portion 510 guides the yarn portion of bonded yarn 142 as it is pulled through shaper 550. Bottom portion 520 of shaper 550 includes surface 530 for shaping the thermoplastic portion of bonded yarn 142 as discussed above. As bonded yarn 142 is pulled past surface 530, surface 530 presses against the thermoplastic portion of bonded yarn 142 to alter the shape of the thermoplastic portion of bonded yarn 142 or to remove (e.g., cut away) some of the thermoplastic portion of bonded yarn 142.

Figure 6:
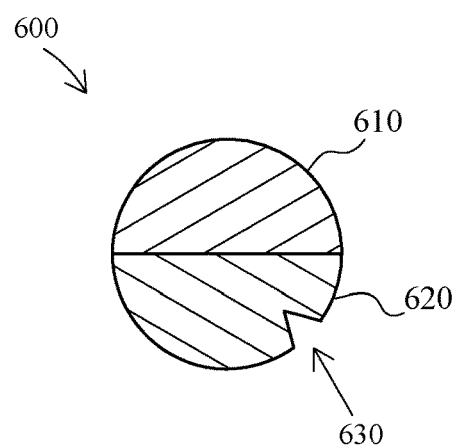
FIG. 6 is a cross-sectional view of a bonded yarn after shaping.

The profile of shaped yarn 600 as it exits shaper 550 is shown in FIG. 6. The profile of bonded yarn 142 as it enters shaper 550 corresponds to profile 320. The shape of yarn portion 610 of bonded yarn 142 is not altered as it passes through shaper 550 so that the shape of the yarn portion of shaped yarn 600 is about the same shape as the yarn portion of bonded yarn 142. The shape of thermoplastic portion 620 of shaped yarn 600 has been altered (630) so that it is not the same shape as the thermoplastic portion of bonded yarn 142.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

What is claimed is:

1. A method for bonding a strand of a yarn to a strand of a thermoplastic to form a bonded yarn, the method comprising:
   pulling a length of the yarn from a source of the yarn;
   pulling a length of the thermoplastic from a source of the thermoplastic;
   aligning the length of the yarn with the length of the thermoplastic;
   pressing the yarn against the thermoplastic at a nip point between a first roller and a second roller to bond the yarn and the thermoplastic to form the bonded yarn; and
   prior to pressing, adjusting a thickness of the strand of the thermoplastic to vary a content of the thermoplastic along a length of the bonded yarn; wherein:
   adjusting the thickness comprises changing the thickness of the strand of the thermoplastic along its length.

2. The method of claim 1 wherein pulling comprises positioning the yarn against the first roller so that friction between the yarn and the first roller provides a force to pull the yarn.

3. The method of claim 2 wherein positioning comprises positioning the yarn in a groove around a circumference of the first roller.

4. The method of claim 1 wherein pulling comprises positioning the thermoplastic against the second roller so that friction between the thermoplastic and the second roller provides a force to pull the thermoplastic.

5. The method of claim 4 wherein positioning comprises positioning the thermoplastic in a groove around a circumference of the second roller.

6. The method of claim 1 wherein:
   pulling the length of the yarn comprises positioning the yarn against the first roller so that friction between the yarn and the first roller provides a force to pull the yarn;
   pulling the length of the thermoplastic comprises positioning the thermoplastic against the second roller so that friction between the thermoplastic and the second roller provides a force to pull the thermoplastic; and
   aligning comprises positioning the first roller with respect to the second roller to move the yarn into contact with the thermoplastic.

7. The method of claim 6 wherein:
   positioning the yarn comprises positioning the yarn in a first groove of the first roller; and
   positioning the thermoplastic comprises positioning the thermoplastic in a second groove of the second roller.

8. The method of claim 7 wherein aligning comprises positioning the first groove and the second groove so that as the first roller and the second roller rotate, the first groove and the second groove are in a same plane.

9. The method of claim 6 wherein pressing comprises rotating the first roller and rotating the second roller to move the yarn and the thermoplastic through the nip point.

10. The method of claim 1 wherein pressing comprises compressing a volume of the yarn and a volume of the thermoplastic at the nip point.

11. The method of claim 1 wherein pressing comprises applying a magnitude of a force against the yarn and the thermoplastic.

12. The method of claim 1 further comprising heating and adjusting a temperature wherein:

heating comprises heating the yarn and the thermoplastic prior to pressing; and adjusting a temperature comprises at least one of further increasing, decreasing, and maintaining a temperature of at least one of the yarn and the thermoplastic after heating, but prior to pressing.

13. The method of claim 1 wherein pressing comprises:
pressing the yarn against an inner surface of the first roller at the nip point; and
pressing the thermoplastic against an inner surface of the second roller at the nip point; wherein
pressing against the inner surface of the first roller and the inner surface of the second roller provides the bonded yarn with a profile.

14. The method of claim 13 wherein the profile of the bonded yarn is selected from the group consisting of circular and rectangular.

15. The method of claim 1 wherein changing the thickness comprises one of increasing and decreasing the thickness of the strand of the thermoplastic along the bonded yarn so that a portion of the bonded fabric has respectively one of more thermoplastic and less thermoplastic than other portions of the bonded fabric.

16. A method for bonding a strand of a yarn to a strand of a thermoplastic to form a bonded yarn for weaving into a bonded fabric, the method comprising:
pulling the strand of the yarn and the strand of the thermoplastic from a source of the yarn and a source of the thermoplastic respectively;
aligning the strand of the yarn with the strand of the thermoplastic;
pressing the strand of the yarn against the strand of the thermoplastic at a nip point between a first roller and a second roller to bond the strand of the yarn and the strand of the thermoplastic to form the bonded yarn;
weaving the bonded yarn to make the bonded fabric; and
prior to pressing, adjusting a thickness of the strand of the thermoplastic along a length of the strand of the thermoplastic to vary a content of the thermoplastic throughout the bonded fabric; wherein:
adjusting the thickness comprises changing the thickness of the strand of the thermoplastic along its length.

17. The method of claim 16 wherein changing the thickness comprises increasing the thickness of the strand of the thermoplastic along the bonded yarn so that a portion of the bonded fabric has more thermoplastic than other portions of the bonded fabric.

18. The method of claim 16 wherein changing the thickness comprises decreasing the thickness of the strand of the thermoplastic along the bonded yarn so that a portion of the bonded fabric has less thermoplastic than other portions of the bonded fabric.

19. A method for bonding a strand of a yarn to a strand of a thermoplastic to form a bonded yarn, the method comprising:
pulling the strand of the yarn from a source of the yarn;
pulling the strand of the thermoplastic from a source of the thermoplastic;
aligning the strand of the yarn with the strand of the thermoplastic;
pressing the yarn against the thermoplastic at a nip point between a first roller and a second roller to bond the yarn and the thermoplastic to form the bonded yarn;
prior to pressing, adjusting a thickness of the strand of the thermoplastic to vary a content of the thermoplastic along a length of the strand of the thermoplastic; and
altering a shape of the thermoplastic of the bonded yarn; wherein:
adjusting the thickness comprises changing the thickness of the strand of the thermoplastic along its length.

20. The method of claim 19 wherein altering the shape comprises removing a portion of the thermoplastic of the bonded yarn.

* * * * *